United States Patent
Lane et al.

(10) Patent No.: US 7,716,299 B2
(45) Date of Patent: May 11, 2010

(54) DETERMINING THE CONFIGURATION OF A DATA PROCESSING SYSTEM EXISTING AT THE TIME A TRANSACTION WAS PROCESSED

(75) Inventors: Robert B. Lane, Portsmouth (GB); Nicholas J. Midgley, Waterlooville (GB)

(73) Assignee: International Business Machines Corporation, Armonk, NY (US)

( * ) Notice: Subject to any disclaimer, the term of this patent is extended or adjusted under 35 U.S.C. 154(b) by 1556 days.

(21) Appl. No.: 10/993,232

(22) Filed: Nov. 18, 2004

(65) Prior Publication Data

US 2006/0031122 A1    Feb. 9, 2006

(30) Foreign Application Priority Data

Dec. 3, 2003    (GB) ................................. 0327950.2

(51) Int. Cl.
G06F 15/16 (2006.01)
G06F 12/00 (2006.01)
G06F 17/30 (2006.01)

(52) U.S. Cl. ...................................... 709/207; 707/203

(58) Field of Classification Search ......... 709/223–226, 709/228, 238–244, 246–247; 705/16, 3
See application file for complete search history.

(56) References Cited

U.S. PATENT DOCUMENTS

| | | | |
|---|---|---|---|
| 5,530,861 A * | 6/1996 | Diamant et al. | 705/8 |
| 6,651,076 B1 * | 11/2003 | Asano | 707/204 |
| 2002/0188476 A1 * | 12/2002 | Bienvenu et al. | 705/3 |
| 2003/0028402 A1 * | 2/2003 | Ulrich et al. | 705/3 |
| 2004/0205653 A1 * | 10/2004 | Hadfield et al. | 715/530 |
| 2004/0225535 A1 * | 11/2004 | Bond et al. | 705/4 |
| 2005/0027750 A1 * | 2/2005 | Martin et al. | 707/200 |

* cited by examiner

*Primary Examiner*—Patrice Winder
*Assistant Examiner*—Xiang Yu
(74) *Attorney, Agent, or Firm*—Schmeiser, Olsen & Watts; Arthur J. Samodovitz

(57) ABSTRACT

The invention provides a method, system and computer program product for determining the configuration of a data processing system at the time a transaction was processed. A transaction is received from a client device and tracked through the data processing network. Each processing node within the data processing network is assigned a unique identifier which identifies the configuration of the processing node. As the transaction is routed from one processing node to the next, the unique identifier of the processing node is stored to form a transaction path. Once the transaction has been committed to storage, a unique value is generated uniquely identifying a particular transaction path permutation.

21 Claims, 4 Drawing Sheets

DETERMINING THE CONFIGURATION OF A DATA PROCESSING SYSTEM EXISTING AT THE TIME A TRANSACTION WAS PROCESSED

FIELD OF THE INVENTION

The invention relates generally to configuration management and more particularly, to a method and a system for determining the configuration of a data processing system at the time a transaction is processed.

BACKGROUND OF THE INVENTION

Organizations use computer systems to carry out a variety of business tasks, for example accounting, on-line processing and financial forecasting etc. Each type of organization is required to meet certain regulatory requirements with regards to the data that is gathered. For example, in the financial sector, the US Securities and Exchange Commission has imposed stringent record retention requirements on financial brokers involving secure long term archival and retrieval of customer correspondence, including audit trails for both retrieval and disposition.

Regulatory compliance not only requires the retention of data for extended periods of time, but also to demonstrate the computer systems' configuration and the process by which data was gathered in the event of a legal dispute surrounding the content of a particular element of data. An example of this can be found in the Insurance Industry. When a customer purchases an insurance policy over a computer network such as the Internet, the customer is required to surrender certain information pertaining to himself or herself, for example, details about the asset to be insured and the type or insurance coverage the customer wishes to purchase. If at some time in the future a legal dispute arises over the insurance policy, for example, that incorrect details were given, this may affect the type of coverage that a customer was given under his or her insurance policy. As a result, the insurance company may be obligated to reconstruct the configuration of the computer system at the exact time of processing the customer's insurance policy, to determine what output parameters would be generated based on the corrected input parameters.

Therefore, an object of the present invention is to determine the configuration of a data processing system at the time a transaction is processed.

SUMMARY OF THE INVENTION

The present invention resides in a system, method and program product for determining a plurality of processing nodes which processed a transaction request from a client device. At each of the plurality of processing nodes part or all of the transaction request to be processed is received. In each of the plurality of processing nodes, an identifier of the processing node is written in a record in association with the transaction request. Configuration of each of the plurality of processing nodes is determined. This configuration is at a time the part or all of the transaction request is processed at the respective processing node. The record associated with the transaction is stored.

In accordance with a feature of the present invention, the determination of the configuration of each of the processing nodes is performed based on the recorded identifier for the processing node.

In accordance with another feature of the present invention, the record accompanies the part or all of the transaction request as the part or all of the transaction request travels from processing node to processing node of the plurality of processing nodes.

The present invention advantageously allows determination of the configuration of a data processing network at the time a transaction was processed. The present invention also allows the tracking of a transaction when it is received by the data processing system from a client device. Each transaction is tracked as it is routed through the data processing system passing from one processing node to the next. Each time the transaction is processed by a processing node, the identifier of the processing node is written to the header record of the transaction. The list of identifiers within the header record form a transaction path, which identifies the transaction path the transaction, was routed through.

Each processing node may comprise different hardware and software components. Each of these hardware and software components interacts with the transaction data in many different ways depending on the processing requirements of the transactional data. This in turn, may produce different results.

Preferably each processing node and its configuration are determined by the level of information that a system administrator wishes to be provided, with regards to the transaction. A system administrator may only want to track transactions at a very high level and hence server to server identification may suffice. At a lower level it may be necessary to track a particular software component i.e. an application that carries out some computational task on the transaction.

Each processing node is assigned an identifier. The identifier is used to perform a lookup in a data store in a configuration management system to locate the configuration data associated with the processing node. Each set of configuration data is given a configuration identifier which identifies the current configuration of the processing node. If the configuration of a processing node is updated, changed or deleted, the set of configuration data is given a new identifier. Therefore the identifier of the processing node is static, but the configuration identifier is updated as soon as a change is made to the processing nodes configuration.

Once the transaction is completed, for example, the transaction is to be committed to storage, a lookup is performed within the configuration management system to locate the configuration identifier associated with the processing node. The transaction path comprising the identifiers of the processing nodes is mapped onto the configuration identifiers. This indicates the current configuration of the processing nodes and provides the transaction path that is to be committed to storage. A unique value is generated based on the permutation of the transaction path.

In another embodiment of the present invention, duplicate entries of processing nodes for a transaction are removed before storing in a data store.

Preferably, the present invention includes a list of all possible transaction paths that a transaction may be routed through. Before a unique value is generated for a transaction, the transaction path pertaining to a particular transaction is checked against the list. If the permutation does not exist, an alert is generated within the system to flag to a system administrator that a transaction has been routed through a transaction path that theoretically does not exist. This could determine an error within the transaction or within the processing nodes.

Viewed from another aspect the present invention provides a computer program product directly loadable into the internal memory of a digital computer, comprising software code

BRIEF DESCRIPTIONS OF THE DRAWINGS

DETAILED DESCRIPTION OF THE INVENTION

The present invention will now be described in detail with reference to the figures, where like reference numbers indicate like elements throughout.

Figure 1:
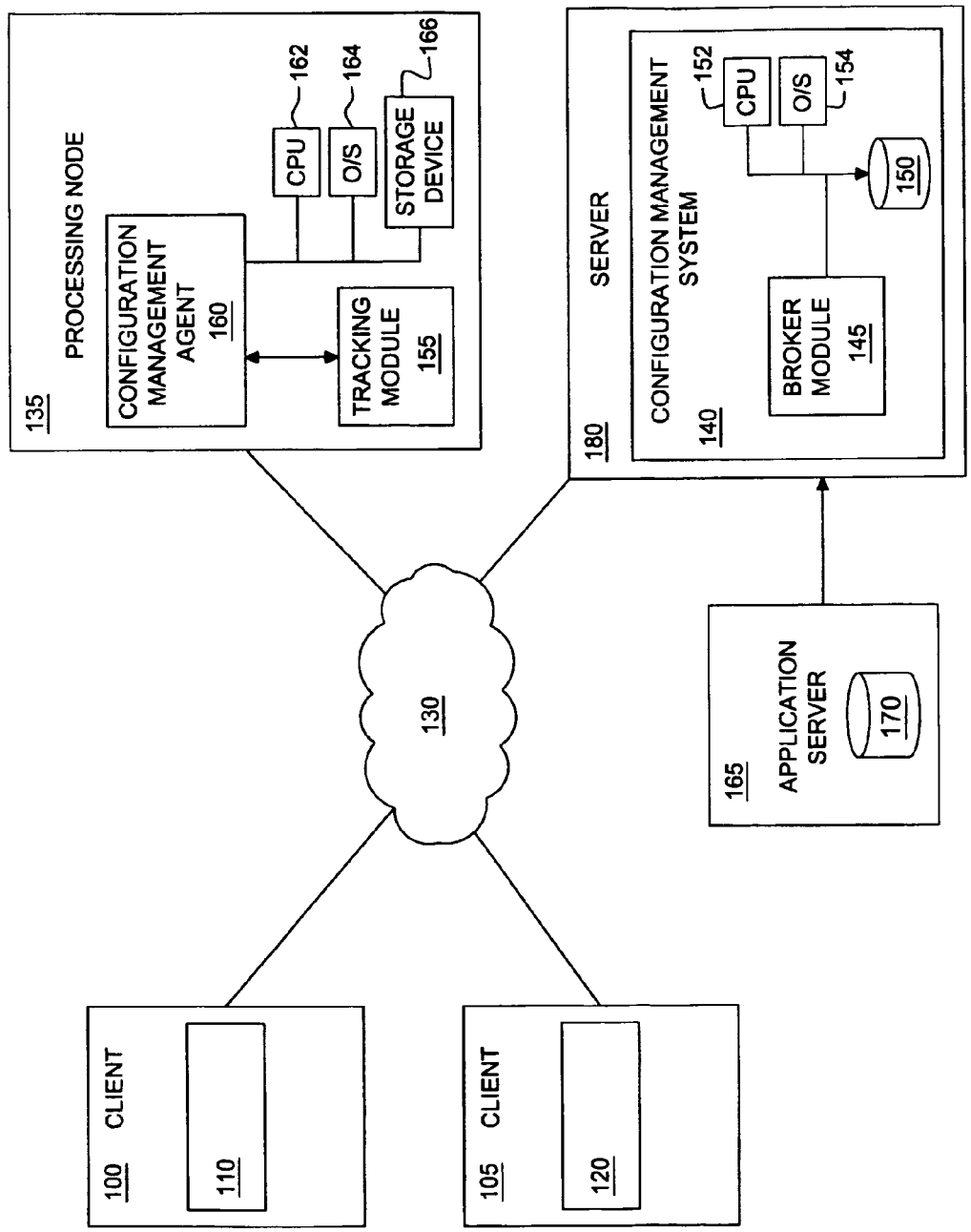
FIG. 1 is a block diagram of a data processing network in which the present invention is incorporated.

FIG. 1 illustrates a distributed computer system or data processing network comprising a server 180, a processing node 135, an application server 165, and client computers 100 and 105. Server 180 comprises a configuration management system 140, a broker module 145 and a non-volatile data store 150 for storing one or more records of transaction path permutations. Processing node 135 comprises a tracking module 155 and a configuration management agent 160, a CPU 162, an operating system 164 and a storage device 166. Application server 165 handles transaction requests and includes a non-volatile data store 170 for storing one or more transaction records, all of which are connected to a network 130 for communication with client computers 100 and 105.

As is known in the art configuration management identifies how various IT components (e.g., hardware, software, service-level agreements, documentation, databases, policies and procedures) are linked together within an IT environment. For example, a workstation 'X' has an operating system and a number of other software applications installed at a particular time.

The configuration management system 140 allows the tracking of a processing node's 135 hardware and software configuration including physical and logical network information and administrative information such as personnel information and location information, etc. To enable configuration data to be extracted from each processing node 135 within a data processing network, as is known in the art, a configuration agent 160 is installed on a processing node 135. The processing node 135 may be a client computer or a server computer running a variety of software applications.

The configuration agent 160 extracts the configuration data into a flat file, and sends this file to an importer agent (not shown) installed on a server. The importer agent extracts the configuration data from the flat file and writes the configuration data to a data store. For example, the data store could be a relational database on which SQL queries can be performed to obtain the configuration data stored in the data store (not shown) and the results displayed within a graphical user interface.

The configuration data gathered from each processing node 135 may comprise information about the hardware and software installed on each processing node, an identifier to identify the set of configuration data for that processing node and the processing nodes identifier.

An example of a set of configuration data for a processing node is as follows:

Processing node: C
ID: C1a
Server serial number: 78XXB31
Operating system (OS): AIX
OS version number: 5
Applications: Transaction verification V2.6
   Risk engine—high risk V8.91

Over a period of time a service provider may be required to update the configuration of a particular processing node 135, for example, upgrading an application to a newer version. When any component (hardware or software) on the processing node is replaced or updated, the configuration data stored in the configuration management's data store is also updated.

An example of this is as follows:
Processing Node C
Identifier: C1
Configuration data
   Risk assessment application V1.24
   Credit check application V1.33

If a newer version of the risk assessment application (i.e. risk assessment application V1.3) is installed on processing node C, the configuration management writes the name and version number of the hardware and software to the data store, either appending the entry in the data store or overwriting an existing entry. A new identifier is assigned to the configuration data to reflect the change. For example, in the example below, the risk assessment application has been updated to version 1.3. To reflect the configuration of processing node C, the configuration data is assigned a new identifier C1a.

Processing Node C
Unique ID: C1a
Configuration data
   Risk assessment application V1.3
   Credit check application V1.33

Thus, the internal configuration of a processing node is continually updating.

In order to reconstruct the components used within a data processing system which processed a transaction, it is necessary to identify the transaction path that a transaction follows during processing.

The present invention provides a tracking module 155 which interfaces and extends the functionality of the configuration management agent 160 to identify the transaction path that a transaction follows while being processed. The tracking module 155 may be implemented on each processing node 135. The tracking module may be implemented as an API protocol in the application layer of the OSI protocol model. An API is an application protocol that is designed to meet the communication requirements of specific applications, often defining the interface to a service. An API may be implemented as an HTTP, FTP, CORBA or IIOP protocol depending on the specific application requirements.

A transaction path may be defined as the nodes and sub-nodes that a transaction follows during processing. A processing node may be any device or component that is capable of performing a computational task, such as a client or server device. Within a processing node there may be sub processing nodes, for example, applications that also perform computational tasks. A processing node or sub processing node is classified by how a particular component of a processing node affects the outcome of the transactional data. For example, an application that receives a transaction and verifies that the input parameters are colTect, may be classified as one verification application executing on one processing node. Conversely, a risk assessment engine may be divided into three processing nodes as the outcome of each of the three risk assessment engines will have a significant effect on the output of the transactional data. For the remainder of this document, unless otherwise stated, the term processing node is also intended to encompass the term sub processing nodes.

The routing of a transaction's processing is achieved by one or more application calls embedded within the source code of an application residing on a processing node. For example, when processing a transaction, a data structure may be passed along with the transaction data. The data structure may be populated with a data element which comprises an identifier of the processing node. The data structure is populated by a processing node, as it is passed along with the transaction data, from one processing node to another. Application logic of the application running on each processing node incorporates the appropriate program code to enable capturing of the unique identifier of the processing node performing the processing. Transfer of the data structure between processing nodes may be performed using a structured data scheme carrier, for example, XML, or a parameter list.

In one embodiment of the present invention, the method described above, may be carried out within a distributed environment, such as an Intranet. Within a distributed environment, computers communicate by using a request/reply protocol such as HTTP. A request message may be sent to a web server, requesting a resource. In response to the request message, a reply message is sent back to the requester and may incorporate the web server's host name into the reply message, for example, http://www.acme.co.uk/servlet/response?node=gbweb01.

A web service running on a web server may invoke the processing on a processing node by encoding the processing node's host name or some other unique identifier, as described above. An example, of such an encoding is using the Simple Object Access Protocol (SOAP) and encoding the unique identifier of the processing node with one or more SOAP header elements.

In another embodiment of the present invention, the tracking agent 155 may obtain the processing node's unique identifier. A code library may be provided on the processing node, allowing a function call to be made to obtain the unique identifier of the processing node, for example, retrieve_nodeId( ). The function call enables the unique identifier of the processing node to populate the appropriate record within the data structure.

The present invention also provides a broker 145 which runs on the server 180. The broker 145 interfaces and extends the functionality of the configuration management system 140. The broker 145 may be implemented using any type of programming language that is suitable for a use in a distributed environment. The broker 145 identifies itself to the tracking agents installed on each processing node by an application call within the processing node itself, such that each tracking agent knows where to locate the broker 145. The broker 145 calculates a unique value based on the transaction path for a given transaction. The unique value is generated by an algorithm and used by the broker 145 to map the transaction path of a processing node 135 into a numerical value of a fixed size. The value is used to perform a reverse lookup query on a transaction record stored in a data store in order to retrieve the configuration list of each of the processing nodes 135 involved in the processing of a transaction. The transaction path and the value are written to a data store for archival and retrieval. The data store may be implemented as a database or any other archival and retrieval mechanism suitable for use in a distributed environment.

A user's computer 100 (or 105) is running a web browser program 110 (or 120) for accessing applications over the network 130 for communication with the server 135. As is known in the art, a web browser is an application program which is capable of sending Hypertext Transfer Protocol (HTTP) requests to web servers to access information on the World Wide Web. Similarly, the user's computer 100, 105 and the server 135 could equally be components of a local network or intranet. The user's computer 100, 105 is not limited to a particular type of data processing apparatus, and may be a conventional desktop or laptop personal computer, a personal digital assistant (PDA) or another specialized data processing device which is capable of running a client requestor program. The user's computer may connect to a network of data processing systems via wireless or hardwired connections.

The servers 135, 180, 165 and the user's computers 100, 105 may be remote from each other within the network, such as if the invention is used for obtaining an insurance policy or ordering goods from a plurality of web services accessed via computers connected to the Internet and accessible via the World Wide Web.

The server 135, 165 can be any data processing apparatus which is capable of running a configuration management system, or similar program. Software-implemented elements of the embodiments described in detail below are not limited to any specific operating system or programming language. The server 135 can be any type of server including a server with a plurality of logical partitioned disks or physical disks.

Figure 2:
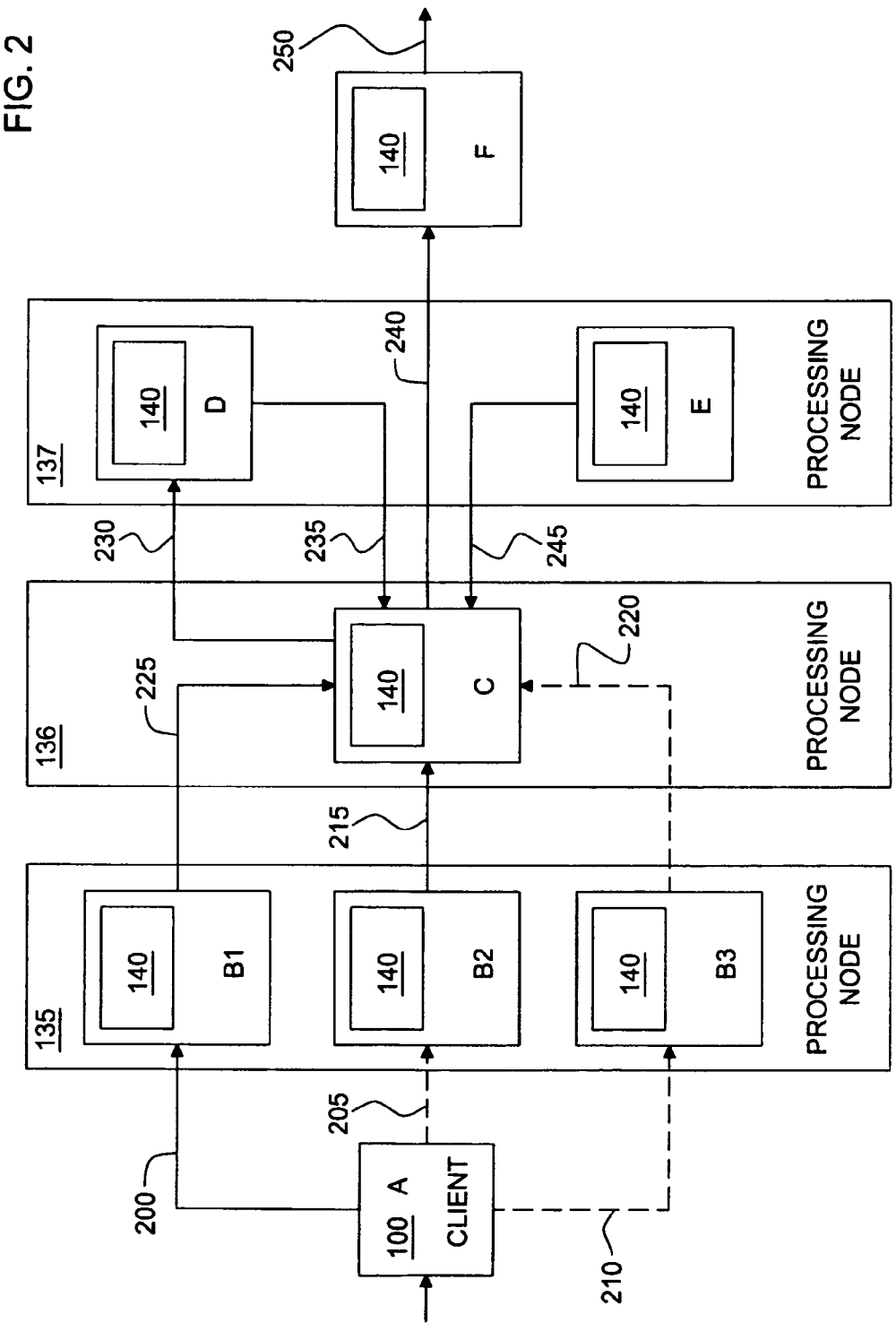
FIG. 2 is a block diagram of processing nodes of FIG. 1 for transactions, which processing nodes are tracked in accordance with the present invention.

Referring to FIG. 2, a schematic view of a plurality of transaction paths 200, 205, 215, 220 etc. are illustrated along with a plurality of processing nodes, 135, 136, 137, B1, B2, B3, C, D, E, F. Processing node 135 comprises three sub processing nodes B1, B2 and B3. In FIG. 2, processing node A represents an incoming transaction from a client device 100. Depending on the processing requirements of the transactional data, the transaction may be routed to any one of a number of other processing nodes. As previously explained, when processing a transaction a variety of hardware and software may be required in order to carry out the processing of the transaction. Using an example of purchasing an on-line insurance policy, an application will be required to handle the transaction request i.e. extracting the data from an HTTP form and routing the transaction data to another processing node to carry out a risk assessment or a credit check and to collate and print out an insurance proposal for sending to a requestor. To illustrate an example, the following is a notation of a transaction path.

A→B1→C-→F

The above transaction path is achieved by the transaction starting from processing node A, and A performing a computational task and determining the next transaction path for the processing of the transaction. The transaction's processing is routed along a designated transaction path to processing node B1, where B1 performs a computational task and once again routes the processing of the transaction to the next processing node, which in this example is processing node C. Once processing node C has completed its processing of the transaction, the processing of the transaction is routed to the final processing node F.

The final processing node may be defined by a submit action or a save action etc. The final processing will be dependent on the needs of the data processing system in which the transaction is processed. The permutation for each processing node generated while the transaction is being processed may be encoded into each database transaction. Alternatively, the encoding of the transaction path permutation and its writing to the data store may only be performed when the application processing step involves the writing of data which completes the transaction processing flow. For example, during the purchasing of a product through an on-line (e-commerce) shop, the user may elect to save the current status of his or her shopping basket, or the current quote (if an insurance or a travel web site perhaps). The status of the transaction data at this time may not be deemed to be appropriate to commit to the database as a permanent indicator of the transaction path permutation. Instead the data may be written into a separate data store in order to maintain history and the state of the existing process, so that if the user returns and later accepts the existing quote, the previous transaction processing steps may be retrieved. Any further processing steps will be appended to the previously saved transaction processing steps and processed accordingly during the final transaction commit process.

The transaction path may be gathered by the node responsible for issuing the database write request. This could be for example within an e-business infrastructure an application server. In one embodiment of the present invention, an API call may be made in the final processing step to retrieve the permutation from the configuration management system. The API call could be implemented, for example, as a web service request, or an EJB call, or any other form of synchronous query to the configuration management systems which will provide the appropriate supporting interface. Within the application code, the call could be implemented as permutation=GetPermutationID (transactionPath); where transactionPath contains a concatenated string of node identifiers with separators in a format which will be recognized by the configuration management system. The API may reformat the string into an appropriate format to support the query, including the reordering of the elements within the string into an alphabetical list and other reformatting to meet the requirements of the configuration management system.

In another embodiment of the present invention, the query process may result in a local cache being constructed within the application server to perform a remote query to the configuration management system is reduced in order to improve performance of the system. This cache would be refreshed when the configuration management system indicates that its permutation database has been updated with new permutations. The resulting value placed in 'permutation' is then included as a parameter in the database write call to the database subsystem, where this value is written along with the other transaction data into a row in the database. The resulting database write may result in multiple rows being written to the database, and the database schema will dictate how the permutation information is linked to these rows. For example, this may be via a key field. Alternatively, the permutation may be associated with each row in every table of a data store.

Another example of a more complicated transaction path may comprise the following:
A→B2→A→B1→C→D→C→F To explain the above transaction path further, the processing of the transaction starts from processing node A and takes communication path 205, to arrive at processing node B2. In this instance, the processing of the transaction may require further input from the user i.e. to supply further information. Therefore, the processing of the transaction travels back along (see above) communication path 205, to the client computer 100. Once the required information has been submitted, the processing of the transaction travels along communication path 200 to reach processing node B1. As explained previously, a transaction may need to be processed by different processing nodes. In this example, the transaction was initially processed by processing node B2, but then in order to continue processing the transaction, further data input was required from the user. The processing of the transaction was routed back to A for further input and then routed onto processing node B1.

Due to the additional information supplied by the user, the processing of the transaction was routed to be processed by B1 rather than B2. This may be because a different risk assessment application was required to process the transaction. Once B1 has processed the transaction, the processing of the transaction is routed along communication path 225 to reach processing node C. Processing node C processes the transaction, and the processing of the transaction travels along communication path 230 to processing node D. This time because of a change in the data requirements, the processing of the transaction travels back along communication path 230 to processing node C. Once processing has been completed by processing node C, the processing of the transaction travels along communication path 240 to the last processing node F. There are many exit points within a data processing system, and FIG. 2 is for illustrative purposes only.

Consider again the same transaction path example as above: A→B2→A→B1→C→D→C→F. It can be seen that there is duplication of a visited node i.e. C. In order to determine the components of a data processing system at the time the transaction was processed, it is not necessary to store duplication of a processing node in the data store. This is because the calculated unique value will indicate whether the configuration of a processing node has changed. Nevertheless, in a preferred embodiment of the present invention, the tracking agent tracks and stores each occurrence of the processing node that has been involved in processing the transaction. Once the tracking agent has detected that the transaction has been committed and written to a data store, the broker normalizes the transaction path to remove any duplicate processing nodes.

In another embodiment of the present invention, it may be important as to how many times a transaction is processed by the same processing node. For example, a transaction may run in node C twice but use different applications. In this instance it will be up to the system administrator to decide which applications are important. If it is determined that an application is important, the application may be defined as a sub processing node and configuration data will be collected on the sub processing node.

The example below, illustrates a transaction path before and after normalization.

Tracked transaction path: A→B2→A→B2→A→B1→C→D→C→F, with duplication of processing node. Normalized transaction path: A→B2→B1→C→D→F, without duplication of processing node.

The transaction path in the denormalized form is stored in a data store, such that if any irregularities are detected when the data processing system is reconstructed, from the unique value of the normalized transaction path, the denormalized form will show the exact transaction path for a given transaction.

Other permutations of transaction paths may be defined as follows, but not limited to: A→B3→C→D→C→F normalized to A→B3→C→D→F; and A→B1→A→B2→A→B3→C→E→D→C→F normalized to A→B1→B2→B3→E→D→C→F;

The above are not the only permutations available from FIG. 2, but in fact there may be many other possible permutations. The permutations may be stored in any arrangement and not necessarily in the order that the processing nodes identifiers were collated.

Further, FIG. 2 is by way of an example only and it will be appreciated by a person skilled in the art that many types of and arrangements of data processing networks exist, as for example, in a grid environment and therefore many types of permutation are available.

Figure 3:
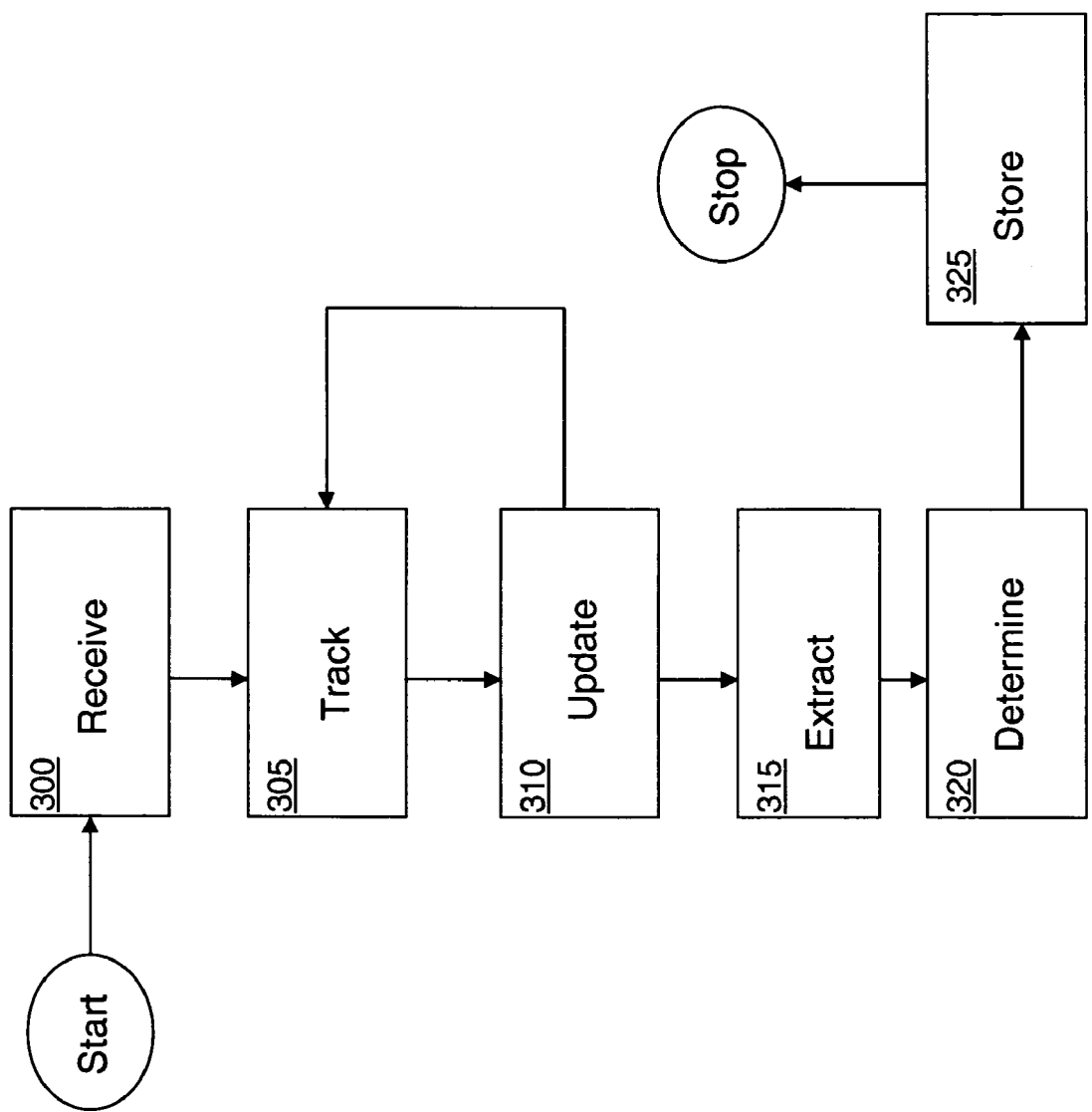
FIG. 3 is a flowchart illustrating a method and computer program product for carrying out the present invention.

Referring to FIG. 3, the method steps of the present invention are explained. A processing node 135 receives a transaction to be processed from a client device 100 at step 300. The tracking agent 155 running on the processing node 135, 136, 137 waits for a transaction to be received by the processing node for processing, at step 305. Each transaction comprises a data structure, for example, a header record that travels along with the transaction data. As the transaction is processed by a processing node, each tracking agent writes the unique identifier of the processing node, to the header record. For example, if a transaction is processed by processing nodes A, B, D and F, but not C and E, the tracking module running on processing node A, will populate the transaction field in the transaction's header file with identifier A. The processing of the transaction moves to processing node B and the header field is updated by appending the identifier B to identifier A, and so on until the header field has been populated by each processing node that has processed the transaction, at step 310. At the last processing node which processes the transaction, the tracking agent extracts the transaction path from the header file and creates a flat file for sending to the broker on the central server 135. The broker 155 receives the flat file and at step 320, determines a unique value for the transaction path. The unique value along with the normalized transaction path is stored in the data store.

Figure 4:
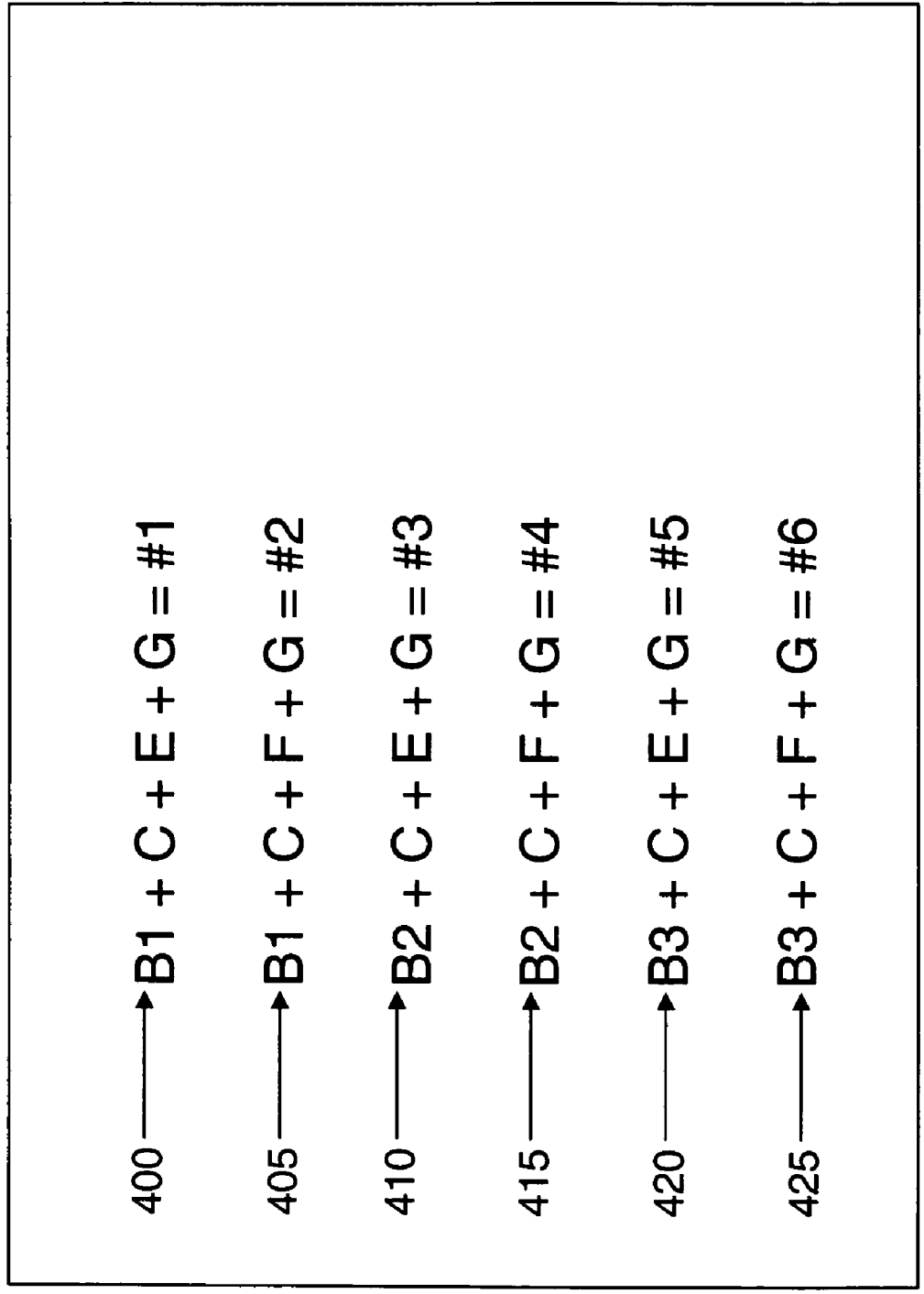
FIG. 4 illustrates a plurality of permutations as derived from the transaction path of a processed transaction of FIG. 2.

With reference to FIG. 4, a number of transaction paths 400, 405, 410, 415, 420 and 425 along with their calculated unique values, are shown. The transaction paths stored in the data store are derived from the transaction path gathered by the tracking agent as a transaction is being processed and then mapping the transaction path onto the equivalent configuration ID obtained from the configuration management system. The unique value is calculated from the mapped transaction path.

In an alternative embodiment of the present invention, the broker 145 may hold a map of all expected transaction path permutations 400, 405, 410, 415, 420, 425 for a given data processing network. When the broker 145 receives the flat file from the tracking agent 155, the broker 145 cross references the transaction path of a transaction against a list of all possible permutations. The broker 145 writes to a data store 150 the permutation for a given transaction, but does not duplicate any permutation already stored in the data store. By cross referencing a transaction path against a list of all possible permutations, the broker is able to verify the transaction path as a valid permutation. If it is found that a transaction path does not exist, an alert can be generated to alert a system administrator to investigate a particular transaction to determine why the transaction has followed a transaction path that should not be available to the transaction. Once a unique value has been generated for a transaction path, the unique value is passed to the transaction server 165, for writing the unique value to a data store 170 along with the transaction record for the transaction. The transaction record is a record of the processed transaction data. The transaction data is derived from the data that a user has input into the data processing system and data that has been generated by one or more processing nodes, in response to the data input by the user. Referring to the table below and in particular Record A, Account ID is an example of data generated by a processing node and surname is an example of data input into the data processing system by the user.

The table below illustrates four examples of transaction records (Record A, Record B, Record C and Record D). Each transaction record comprises a unique identifier, for example, Account ID. The Account ID enables a lookup to be performed in the data store to access details pertaining to the account ID. For example, Record A comprises the account ID 0066779900. If a lookup on account ID 0066779900 is performed, the following records would be found, Midgley, N, #1. The same process may be followed to locate Record B, Record C and Record D.

|  | Account ID | Surname | First Name | # value |
|---|---|---|---|---|
| Record A | 0066779900 | Midgley | N | 1 |
| Record B | 7788335578 | Hall | A | 5 |
| Record C | 1209876456 | Smith | N | 8 |
| Record D | 1029834756 | Jones | C | 111 |

In another embodiment of the present invention, a time stamp may be stored in the data store to distinguish between two transaction records with the same input and the same unique identifier, i.e. Account ID. The time stamp may be created by the broker at the time the unique value is generated for a transaction path.

Queries may be performed on the data store in order to retrieve the configuration of a set of components used in a transaction. For example, if a query was performed to locate Record A, it will be found that the unique value for that transaction was "1". This is used to obtain the transaction path and the configuration data, stored in the configuration management system, to locate the processing nodes used to process a transaction.

Based on the foregoing, a system, method and program product for determining and recording configuration of processing nodes that process a transaction have been disclosed. However, numerous modifications and substitutions can be made without deviating from the scope of the present invention. Therefore, the present invention has been disclosed by way of illustration and not limitation, and reference should be made to the following claims to determine the scope of the present invention.

The invention claimed is:

1. A method for determining software installed in processing nodes which process parts of a transaction request, the method comprising:

a first processing node receiving a first part of said transaction request, and in response, first software installed in said first processing node processing said first part of said transaction request and writing into a record a name of said first processing node and a name and version of said first software, and forwarding to a second processing node said record with said name of said first processing node and said name and version of said first software;

said second processing node receiving directly from said first processing node a second part of said transaction request, and in response, second software installed in said second processing node processing said second part of said transaction request and writing into said record directly received from said first processing node a name of said second processing node and a name and version of said second software to generate a first edited version of said record, and forwarding to a third processing node said first edited version of said record with said name of said first processing node, said name and version of said first software, said name of said second processing node and said name and version of said second software;

said third processing node receiving directly from said second processing node a third part of said transaction request, and in response, third software installed in said third processing node processing said third part of said transaction request and writing into said first edited version of said record directly received from said second processing node a name of said third processing node and a name and version of said third software;

an application server storing said first edited version of said record written by said third processing node to record said name of said first processing node, said name and version of said first software, said name of said second processing node, said name and version of said second software, said name of said third processing node and said name and version of said third software, used to process said first, second and third parts of said transaction request, said application server coupled to said first processing node, said second processing node, said third processing node, and a fourth processing node via a configuration management server and a communication network;

said fourth processing node receiving directly from said first processing node said second part of said transaction request, and in response, fourth software installed in said fourth processing node processing said second part of said transaction request and writing into said record directly received from said first processing node a name of said fourth processing node and a name and version of said fourth software to generate a second edited version of said record, and forwarding to said third processing node said second edited version of said record with said name of said first processing node, said name and version of said first software, said name of said fourth processing node and said name and version of said fourth software;

said third processing node receiving directly from said fourth processing node said third part of said transaction request at said third processing node, and in response, said third software installed in said third processing node processing said third part of said transaction request and writing into said second edited version of said record directly received from said fourth processing node said name of said third processing node and said name and version of said third software;

said application server storing said second edited version of said record written by said third processing node to record said name of said first processing node, said name and version of said first software, said name of said fourth processing node, said name and version of said fourth software, said name of said third processing node and said name and version of said third software, used to process said first, second and third parts of said transaction request;

wherein said first edited version of said record written by said third processing node indicates a first transaction path from said first processing node to said second processing node to said third processing node to respectively process said first, second and third parts of said transaction request;

wherein said second edited version of said record written by said third processing node indicates a second transaction path from said first processing node to said fourth processing node to said third processing node to respectively process said first, second and third parts of said transaction request;

wherein said first processing node, said second processing node, said third processing node, and said fourth processing node are different processing nodes.

2. The method of claim 1, said method further comprising:
said second processing node processing said second part of said transaction request with first data a first time;
said second processing node receiving said second part of said transaction request a second time after said first time, with second, different data, and in response, said second software installed in said second processing node processing said second part of said transaction request with said second data, and determining that the name and version of said second software was the same for processing both said first and second data and in response, not recording a second instance in said record of said name and version of said second software as processing said second part of said transaction request.

3. The method of claim 1, said method further comprising:
based on said first edited version of said record, said application server recording said name of said first processing node and said name and version of said first software, said name of said second processing node and said name and version of said second software, and said name of said third processing node and said name and version of said third software, used to process said transaction request, reconstructing said first processing node with said name and version of said first software, said second processing node with said name and version of said second software, and said third processing node with said name and version of said third software.

4. The method of claim 1, said method further comprising:
said configuration management server comparing said first transaction path to a list of valid transaction paths to determine whether the compared first transaction path is valid, and if not, generating a first error message;
said configuration management server comparing said second transaction path to the list of valid transaction paths to determine whether the compared second transaction path is valid, and if not, generating a second error message.

5. The method of claim 1, wherein said first transaction path extends from said third processing node to a fifth processing node, wherein said second transaction path extends from said third processing node to a sixth processing node, wherein said fifth processing node differs from said first processing node, said second processing node, said third processing node, and said fourth processing node, wherein said sixth processing node differs from said first processing node, said second processing node, said third processing node, and said fourth processing node, and wherein said method further comprises:
said fifth processing node receiving directly from said third processing node a fourth part of said transaction request, and in response, fifth software installed in said fifth processing node processing said fourth part of said transaction request and writing into said first edited version of said record directly received from said third processing node said name of said fifth processing node and said name and version of said fifth software;
said sixth processing node receiving directly from said third processing node said fourth part of said transaction request, and in response, sixth software installed in said sixth processing node processing said fourth part of said transaction request and writing into said second edited version of said record directly received from said third processing node said name of said sixth processing node and said name and version of said sixth software;

wherein said application server is coupled to said fifth processing node and said sixth processing node said configuration management server and said communication network.

6. The method of claim 5, wherein said fifth processing node and said sixth processing node are different processing nodes.

7. The method of claim 5, wherein said fifth processing node and said sixth processing node are a same processing node, wherein said fifth software and said sixth software are a same software, and where said version of said fifth software and said version of said sixth software are a same version of said same software.

8. A computer program product for determining software installed processing nodes which process parts of a transaction request, said computer program product comprising:

computer readable storage media comprising a first computer readable storage medium in a first processing node, a second computer readable storage medium in a second processing node, a third computer readable storage medium in a third processing node, and a fourth computer readable storage medium in a fourth processing node;

first software installed in said first processing node, said first software comprising program instructions for said first processing node receiving a first part of said transaction request, and in response, processing said first part of said transaction request and writing into a record a name of said first processing node and a name and version of said first software, and forwarding to said second processing node said record with said name of said first processing node and said name and version of said first software;

second software installed in said second processing node, said second software comprising program instructions for said processing node receiving directly from said first processing node a second part of said transaction request, and in response, processing said second part of said transaction request and writing into said record directly received from said first processing node a name of said second processing node and a name and version of said second software to generate a first edited version of said record, and forwarding to said third processing node said first edited version of said record with said name of said first processing node, said name and version of said first software, said name of said second processing node and said name and version of said second software;

third software installed in said third processing node, wherein said third software comprises program instructions for said third processing node receiving directly from said second processing node said third part of said transaction request, and in response, processing said third part of said transaction request and writing into said first edited version of said record directly received from said second processing node a name of said third processing node and a name and version of said third software, and wherein said third software comprises program instructions for an application server storing said first edited version of said record written by said third processing node to record said name of said first processing node, said name and version of said first software, said name of said second processing node, said name and version of said second software, said name of said third processing node and said name and version of said third software, used to process said first, second and third parts of said transaction request, said application server coupled to said first processing node, said second processing node, said third processing node, and a fourth processing node via a configuration management server and a communication network;

fourth software installed in said fourth processing node, said fourth software comprising program instructions for said fourth processing node receiving directly from said first processing node said second part of said transaction request, and in response, processing said second part of said transaction request and writing into said record directly received from said first processing node a name of said fourth processing node and a name and version of said fourth software to generate a second edited version of said record, and forwarding to said third processing node said second edited version of said record with said name of said first processing node, said name and version of said first software, said name of said fourth processing node and said name and version of said fourth software;

wherein said third software comprises program instructions for said third processing node receiving directly from said fourth processing node said third part of said transaction request, and in response, processing said third part of said transaction request and writing into said second edited version of said record directly received from said fourth processing node said name of said third processing node and said name and version of said third software;

wherein said third software comprises program instructions for said application server storing said second edited version of said record written by said third processing node to record said name of said first processing node, said name and version of said first software, said name of said fourth processing node, said name and version of said fourth software, said name of said third processing node and said name and version of said third software, used to process said first, second and third parts of said transaction request;

wherein said first edited version of said record written by said third processing node indicates a first transaction path from said first processing node to said second processing node to said third processing node to respectively process said first, second and third parts of said transaction request;

wherein said second edited version of said record written by said third processing node indicates a second transaction path from said first processing node to said fourth processing node to said third processing node to respectively process said first, second and third parts of said transaction request;

wherein said first processing node, said second processing node, said third processing node, and said fourth processing node are different processing nodes;

wherein said first software, said second software, said third software, and said fourth software are respectively stored on said first computer readable storage medium, said second computer readable storage medium, said third computer readable storage medium, and said fourth computer readable storage medium.

9. The computer program product of claim 8, further comprising:

program instructions for said second processing node processing said second part of said transaction request with first data a first time;

program instructions for said second processing node receiving said second part of said transaction request a second time after said first time, with second, different data, and in response, processing said second part of said transaction request with said second data, and determining that the name and version of said second software was the same for processing both said first and second data and in response, not recording a second instance in said record of said name and version of said second software as processing said second part of said transaction request.

10. The computer program product of claim 8, further comprising:
first program instructions for, based on said first edited version of said record, said application server recording said name of said first processing node and said name and version of said first software, said name of said second processing node and said name and version of said second software, and said name of said third processing node and said name and version of said third software, used to process said transaction request, reconstructing said first processing node with said name and version of said first software, said second processing node with said name and version of said second software, and said third processing node with said name and version of said third software;
wherein said first program instructions are stored on the computer readable storage media.

11. The computer program product of claim 8, further comprising:
first program instructions for said configuration management server comparing said first transaction path to a list of valid transaction paths to determine whether the compared first transaction path is valid, and if not, generating a first error message;
second program instructions for said configuration management server comparing said second transaction path to the list of valid transaction paths to determine whether the compared second transaction path is valid, and if not, generating a second error message;
wherein said first program instructions and said second program instructions are stored on the computer readable storage media.

12. The computer program product of claim 8, wherein said first transaction path extends from said third processing node to a fifth processing node, wherein said second transaction path extends from said third processing node to a sixth processing node, wherein said fifth processing node differs from said first processing node, said second processing node, said third processing node, and said fourth processing node, wherein said sixth processing node differs from said first processing node, said second processing node, said third processing node, and said fourth processing node, and wherein said computer program product further comprises:
fifth software installed in a fifth processing node, said fifth software comprising program instructions for said fifth processing node receiving directly from said third processing node a fourth part of said transaction request at said fifth processing node, and in response, processing said fourth part of said transaction request and writing into said first edited version of said record directly received from said third processing node said name of said fifth processing node and said name and version of said fifth software;
sixth software installed in a sixth processing node, said sixth software comprising program instructions for said sixth processing node receiving directly from said third processing node said fourth part of said transaction request at said sixth processing node, and in response, processing said fourth part of said transaction request and writing into said second edited version of said record directly received from said third processing node said name of said sixth processing node and said name and version of said sixth software;
wherein said application server is coupled to said fifth processing node and said sixth processing node via said configuration management server and said communication network;
wherein the computer readable storage media comprises a fifth computer readable storage medium in said fifth processing node and a sixth computer readable storage medium in said sixth processing node;
wherein said fifth software and said sixth software are respectively stored on said fifth computer readable storage medium and said sixth computer readable storage medium.

13. The computer program product of claim 12, wherein said fifth processing node and said sixth processing node are different processing nodes.

14. The computer program product of claim 12, wherein said fifth processing node and said sixth processing node are a same processing node, wherein said fifth software and said sixth software are a same software, and where said version of said fifth software and said version of said sixth software are a same version of said same software.

15. A computer system for determining software installed processing nodes which process parts of a transaction request, said computer system comprising:
processors comprising a first processor in a first processing node, a second processor in a second processing node, a third processor in a third processing node, and a fourth processor in a fourth processing node;
a first, second, third, and fourth computer readable memory in the first, second, third, and fourth processing node, respectively;
computer readable storage media comprising a first computer readable storage medium in the first processing node, a second computer readable storage medium in the second processing node, a third computer readable storage medium in the third processing node, and a fourth computer readable storage medium in the fourth processing node;
first software installed in said first processing node, said first software comprising program instructions for said first processing node receiving a first part of said transaction request, and in response, processing said first part of said transaction request and writing into a record a name of said first processing node and a name and version of said first software, and forwarding to said second processing node said record with said name of said first processing node and said name and version of said first software;
second software installed in said second processing node, said second software comprising program instructions for said processing node receiving directly from said first processing node a second part of said transaction request, and in response, processing said second part of said transaction request and writing into said record directly received from said first processing node a name of said second processing node and a name and version of said second software to generate a first edited version of said record, and forwarding to said third processing node said first edited version of said record with said name of said first processing node, said name and version of said first software, said name of said second processing node and said name and version of said second software;

third software installed in said third processing node, wherein said third software comprises program instructions for said third processing node receiving directly from said second processing node said third part of said transaction request, and in response, processing said third part of said transaction request and writing into said first edited version of said record directly received from said second processing node a name of said third processing node and a name and version of said third software, and wherein said third software comprises program instructions for an application server storing said first edited version of said record written by said third processing node to record said name of said first processing node, said name and version of said first software, said name of said second processing node, said name and version of said second software, said name of said third processing node and said name and version of said third software, used to process said first, second and third parts of said transaction request, said application server coupled to said first processing node, said second processing node, said third processing node, and a fourth processing node via a configuration management server and a communication network;

fourth software installed in said fourth processing node, said fourth software comprising program instructions for said fourth processing node receiving directly from said first processing node said second part of said transaction request, and in response, processing said second part of said transaction request and writing into said record directly received from said first processing node a name of said fourth processing node and a name and version of said fourth software to generate a second edited version of said record, and forwarding to said third processing node said second edited version of said record with said name of said first processing node, said name and version of said first software, said name of said fourth processing node and said name and version of said fourth software;

wherein said third software comprises program instructions for said third processing node receiving directly from said fourth processing node said third part of said transaction request, and in response, processing said third part of said transaction request and writing into said second edited version of said record directly received from said fourth processing node said name of said third processing node and said name and version of said third software;

wherein said third software comprises program instructions for storing said second edited version of said record written by said third processing node to record said name of said first processing node, said name and version of said first software, said name of said fourth processing node, said name and version of said fourth software, said name of said third processing node and said name and version of said third software, used to process said first, second and third parts of said transaction request;

wherein said first edited version of said record written by said third processing node indicates a first transaction path from said first processing node to said second processing node to said third processing node to respectively process said first, second and third parts of said transaction request;

wherein said second edited version of said record written by said third processing node indicates a second transaction path from said first processing node to said fourth processing node to said third processing node to respectively process said first, second and third parts of said transaction request;

wherein said first processing node, said second processing node, said third processing node, and said fourth processing node are different processing nodes;

wherein said first software is stored on the first computer readable storage medium for execution by the first processor;

wherein said second software is stored on the second computer readable storage medium for execution by the second processor;

wherein said third software is stored on the third computer readable storage medium for execution by the third processor;

wherein said fourth software is stored on the fourth computer readable storage medium for execution by the fourth processor.

16. The computer system of claim 15, said second software further comprising:

program instructions for said second processing node processing said second part of said transaction request with first data a first time;

program instructions for said second processing node receiving said second part of said transaction request a second time after said first time, with second, different data, and in response, processing said second part of said transaction request with said second data, and determining that the name and version of said second software was the same for processing both said first and second data and in response, not recording a second instance in said record of said name and version of said second software as processing said second part of said transaction request.

17. The computer system of claim 15, further comprising:

first program instructions for, based on said first edited version of said record, said application server recording said name of said first processing node and said name and version of said first software, said name of said second processing node and said name and version of said second software, and said name of said third processing node and said name and version of said third software, used to process said transaction request, reconstructing said first processing node with said name and version of said first software, said second processing node with said name and version of said second software, and said third processing node with said name and version of said third software;

wherein said first program instructions are stored on the computer readable storage media for execution by a processor of said processors.

18. The computer system of claim 15, further comprising:

first program instructions for said configuration management server comparing said first transaction path to a list of valid transaction paths to determine whether the compared first transaction path is valid, and if not, generating a first error message;

second program instructions for said configuration management server comparing said second transaction path to the list of valid transaction paths to determine whether the compared second transaction path is valid, and if not, generating a second error message;

wherein said first program instructions and said second program instructions are stored on the computer readable storage media for execution by at least one processor of said processors.

19. The computer system of claim 15, wherein said first transaction path extends from said third processing node to a fifth processing node, wherein said second transaction path extends from said third processing node to a sixth processing node, wherein said fifth processing node differs from said first processing node, said second processing node, said third processing node, and said fourth processing node, wherein said sixth processing node differs from said first processing node, said second processing node, said third processing node, and said fourth processing node, and wherein said computer system further comprises:

fifth software installed in a fifth processing node, said fifth software comprising program instructions for said fifth processing node receiving directly from said third processing node a fourth part of said transaction request at said fifth processing node, and in response, processing said fourth part of said transaction request and writing into said first edited version of said record directly received from said third processing node said name of said fifth processing node and said name and version of said fifth software;

sixth software installed in a sixth processing node, said sixth software comprising program instructions for said sixth processing node receiving directly from said third processing node said fourth part of said transaction request at said sixth processing node, and in response, processing said fourth part of said transaction request and writing into said second edited version of said record directly received from said third processing node said name of said sixth processing node and said name and version of said sixth software;

wherein said application server is coupled to said fifth processing node and said sixth processing node via said configuration management server and said communication network;

wherein said fifth software is stored on the fifth computer readable storage medium for execution by said fifth processor;

wherein said sixth software is stored on the sixth computer readable storage medium for execution by said sixth processor.

20. The computer system of claim 19, wherein said fifth processing node and said sixth processing node are different processing nodes.

21. The computer system of claim 19, wherein said fifth processing node and said sixth processing node are a same processing node, wherein said fifth processor and said sixth processor are a same processor, wherein said fifth software and said sixth software are a same software, and where said version of said fifth software and said version of said sixth software are a same version of said same software.

* * * * *